W. C. McCARTHY.
Apparatus for Cleaning Cess-Pools, &c.

No. 138,034.

2 Sheets--Sheet 1.

Patented April 22, 1873.

Witnesses.
Geo. C. Stewart
Jos. Mitchell

Inventor.
William C. McCarthy
By Josiah W. Ellis
Attorney

W. C. McCARTHY.
Apparatus for Cleaning Cess-Pools, &c.
No. 138,034. Patented April 22, 1873.
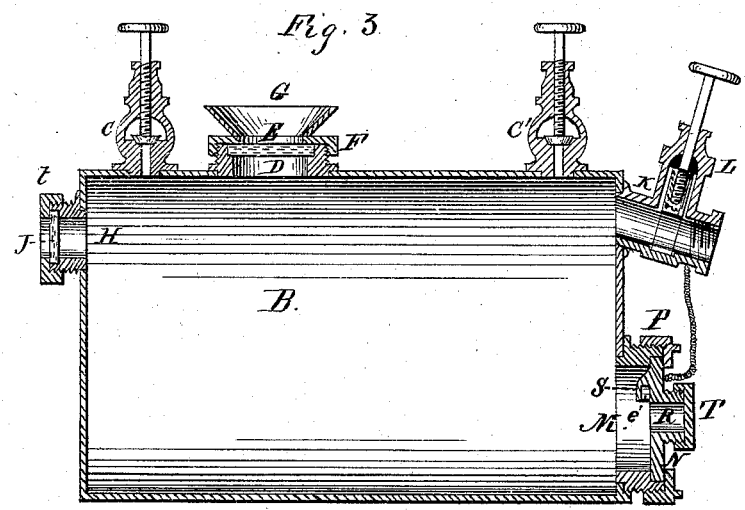
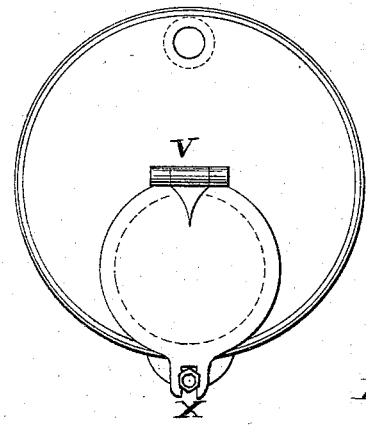
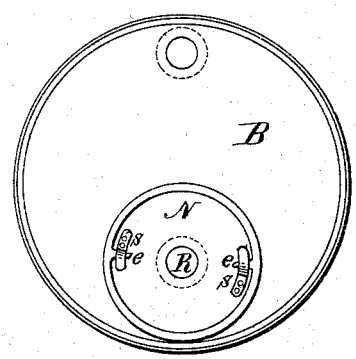
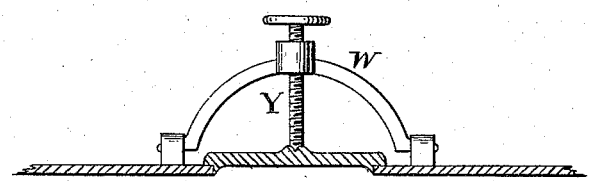
Witnesses.
Geo. C. Stewart
Jos. Mitchell
Inventor.
William C. McCarthy
By Josiah W. Ells
Attorney

UNITED STATES PATENT OFFICE.

WILLIAM C. McCARTHY, OF PITTSBURG, PENNSYLVANIA.

IMPROVEMENT IN APPARATUS FOR CLEANING CESS-POOLS, &c.

Specification forming part of Letters Patent No. 138,034, dated April 22, 1873; application filed December 2, 1872.

*To all whom it may concern:*

Be it known that I, WILLIAM C. MCCARTHY, of Pittsburg, in the county of Allegheny and State of Pennsylvania, have invented a new and useful improvement in that class of apparatus used for the collection and removal of night-soil, and which is designed as an improvement upon that for which a patent was granted to me on the 28th day of June, 1870, wherein provision was made for drawing or forcing all offensive matter from cess-pools through pipes into a close receiving-tank so arranged on wheels as to be readily carted off.

My present invention consists in such a combination and arrangement of devices as will admit of the apparatus being used either as a vacuum-tank, depending on a vacuum created therein, mechanically, or in any other way, for the purposes above mentioned, or where the situation, depth, or condition of the cess-pool is such as to make a vacuum unavailable, then, and in that case, the tank may be filled by means of buckets in the ordinary manner, and the openings so tightly closed as to prevent the escape of any noxious effluvia during transportation.

The construction and operation of this apparatus will be readily understood from the following description, taken in connection with the accompanying drawing, wherein—

Figure 1:
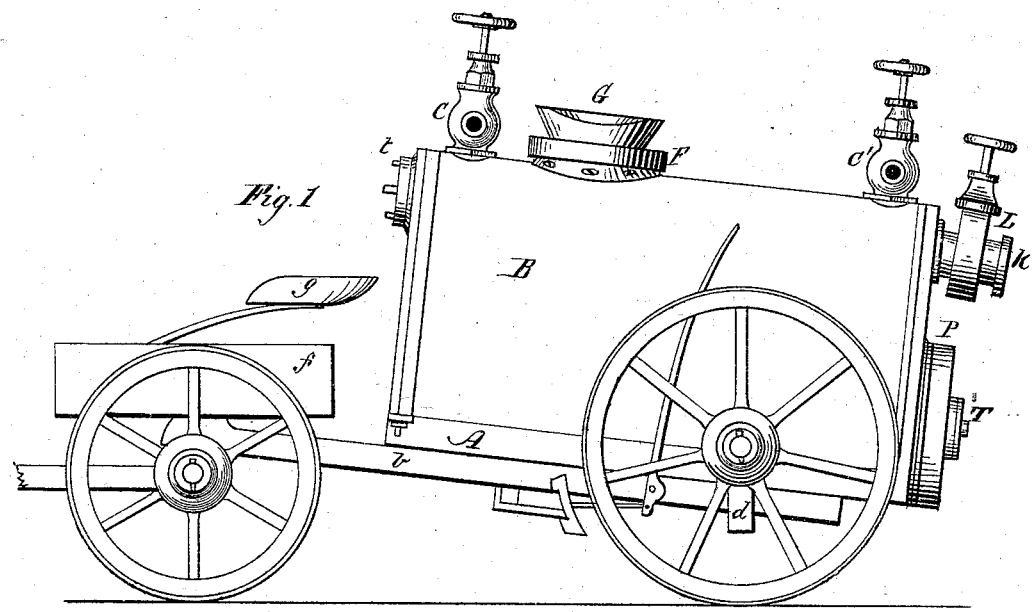
Figure 2:
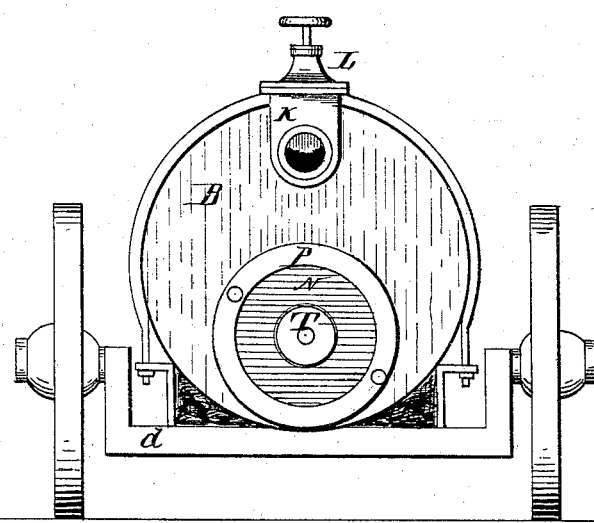

Figure 1 represent a side elevation of my mechanical cess-pool and vault cleaner; Fig. 2, a rear-end view of the same; Fig. 3, longitudinal vertical section of the receiving-tank and its openings; Fig. 4, an inside view of the rear end of the tank; Figs. 5 and 6, modified plans of securing the door of the discharging-orifice.

In constructing an apparatus of this character, I first provide a large cylindrical air-tight tank, B, on the top of which, and near each of its ends, is fitted a globe-valve, C C′, having side openings for the attachment of pipes, so that through one of them live steam may be introduced for the expulsion of any and all air that may be found in the tank, while through the other such air may escape; between these two globe-valves C C′ is arranged a large circular opening, D, surrounded by an upwardly-extending flange, into which is fitted a tightly-closing lid, E, held down on its seat by a circumferential collar, F, supporting a flaring funnel, G, having a semicircular piece cut out of its upper edge, as shown in Fig. 1. On the front end of the tank, and near its top, is a smaller opening, H, similar to the one between the valves C C′, and is opened and closed by a lid, J, and screw-collar in substantially the same manner, while at the rear or opposite end of the tank, and above its center, is situated a projecting pipe, K, furnished with a valve, L, sliding at right angles thereto, and otherwise so constructed as to not only close this pipe perfectly tight when necessary, but when open to give full, free, and unobstructed passage-way to any material or substance that may be drawn or forced through it, the arrangement of the receiving-pipe K being such, with respect to the body of the tank, as that the ingoing matter as it enters falls below and clear of its mouth, and is thus prevented from retarding the inflow. Below this pipe, on the same end of the tank, and as close to its bottom as may be conveniently arranged, is a large circular discharging-orifice, M, closed by a tightly-fitting door, N, held in place and forced to its seat by an overlapping screw-collar, P, in the same manner as the lid J is held to its place on the front of the tank; but being below the surface of accumulated matter something is required to hold it while its collar P is being put on or taken off; to this end I have provided it with two or more catches, S S, at opposite points, so contrived as that when the door N is arranged on its seat a partial rotation will bring said catches to connect each with a projecting lug, *e e*, and by which it is prevented from falling outward on the removal of its collar. In order to avoid the use of these catches and lugs the door and its circumferential screw-collar may or can be made of one piece of metal, or otherwise so united as that they both turn together during the tightening operation, which is not quite so well, neither can the joint be made so close, as when the collar turns, while the door remains stationary. For the purpose of sustaining the heavy door N, together with its screw-collar P, and prevent their falling to the ground when detached from the tank, and also enable them to be swung to one side and out of the way or clear of the discharging-orifice M, I propose to swivel or pivot them to a crane furnished with a "tempering-screw," or other mechanical device, by which they may be adjusted to their respective places with the greatest accuracy, which crane may be arranged at any convenient point, and secured to that end of the tank or wagon. I also propose to use a gum or other elastic packing between the several doors, valves, and their respective seats, by which their respective joints are made perfectly tight.

Although the plan I use for closing and securing the large door N of the discharging-orifice accomplishes that object in a most perfect manner, still other plans may be used that will, to a certain extent, answer the same purpose; for instance, the door may be hung by a hinge, V, at its upper edge to the tank, and forced down to its seat by a pinch-screw, X, at its lower edge, as exemplified in the drawing, Fig. 5; or it may be clamped to its seat by means of a large screw, Y, passing through the center of a hinged yoke, W, as shown in Fig. 6. The cylindrical tank B, with its several openings, valves, and attachments, is to be placed, arranged, and firmly secured on a wagon, A, the hindmost axle $d$ of which is so bent as to bring the bottom of the tank very near the ground, whereby the filling of the tank is easier accomplished, and, when full, it will move steadier over the road. A reach, $b$, extending forward underneath the tank, connects it to the front axle, on which is arranged a box, $f$, for the conveyance of tools, and furnished with a seat, $g$, for the accommodation of the driver. This tool-box $f$ and its seat $g$ may be placed on the tank or in any other position on the apparatus that the circumstances of the case may require.

Operation.

In using this apparatus as a vacuum-tank, I first introduce live steam under pressure through one of the globe-valves C C' in sufficient quantity to expel all atmospheric air through the other globe-valve, opened for that purpose. These valves being closed, and the tank otherwise made air-tight, the steam is suffered to condense till a vacuum is formed more or less perfect; the complete expulsion of the air from the tank, and the formation of a vacuum as nearly perfect as possible, being attained by allowing the air to escape from the highest point of the tank. One end of a flexible tube is then screwed fast to the mouth of the receiving-pipe K, and its other end inserted in the contents of a cess-pool, which are generally more or less of a fluid character; the large valve L is then opened, when the pressure of the air on the liquid contents of the cess-pool will force them up through the flexible tube and onward through the straight open way of the receiving-pipe K into the tank B till the latter is so nearly full that the equilibrium is restored, when the valve L is closed, the flexible tube detached, and the tank wheeled away, so effectually closed that no noxious gases can be given off till the place is reached where the tank is to be emptied. The large door N in the rear of the tank is then removed by first unscrewing its overlapping collar P and giving the door a partial rotation to release its catches S S, when it may be swung to one side, and the contents of the tank allowed to flow out and the tank made ready for refilling.

Whenever the depth, condition, situation, or circumstances surrounding the cess-pool make the use of a vacuum for drawing or forcing its contents unavailable, then and in that case the tank may be filled by means of buckets; and to this end the circular collar F, to which the funnel G is attached, must be unscrewed for the removal of the lid E, so that free communication may be had with the interior of the tank. After the lid has been removed the collar F, with its attached funnel G, is to be replaced, so that the contents of the cess-pool may be poured in guided by the funnel, the semicircular piece cut out of its top edge forming a rest for the buckets, and greatly assisting the operation of filling.

Although the contents of cess-pools are generally of a fluid character, yet sometimes they are intermingled with ashes and solid or semi-solid substances that oftentimes pile up in the tank underneath the charging-orifice and interfere with the filling operation. When such is the case the small door J in the upper front end of the tank may be removed and a hoe or rake introduced for the purpose of leveling the accumulated matter, so that the operation of filling may proceed. When this is completed the lids J and E are to be replaced, screwed down, and the contents of the tank carted off and emptied in the manner hereinbefore set forth.

Claims.

I claim—

1. The air-tight tank B provided with a discharging-orifice, M, in combination with a movable or detachable door, N, as and for the purposes set forth.

2. The air-tight tank B, discharging-orifice M, movable or detachable door N, in combination with the receiving-pipe K and valve L, as and for the purposes set forth.

3. The air-tight tank B, discharging-orifice M, movable door N, in combination with the valves C'C', as and for the purposes set forth.

4. The tank B, discharging-orifice M, movable door N, in combination with the opening D and its lid E, as and for the purposes set forth.

5. The large discharging-orifice M, in combination with a detachable door, N, and circumferential collar P, as and for the purposes set forth.

6. The combination and arrangement, with the top of the tank, of the central opening D provided with a detachable lid, E, held in place by a circumferential screw-collar, F, as and for the purposes set forth.

7. The combination and arrangement of the opening D and lid E with the funnel G, as and for the purposes set forth.

8. The opening H in the front end of the tank, in combination with its lid J and collar $t$, as and for the purposes set forth.

9. The catches S S and lugs $e\,e$, in combination with the orifice M, movable door N, and its surrounding frame, as and for the purposes set forth.

10. The tank B, discharging-orifice M, movable door N, opening D, and its lid E, in combination with the wagon A, substantially as shown.

WM. C. McCARTHY.

Witnesses:
  JOSIAH W. ELLS,
  T. B. FORD.